United States Patent
Sugaya (10) Patent No.: US 11,774,969 B2
(45) Date of Patent: *Oct. 3, 2023

(54) SYSTEM AND METHOD USING IMAGE ANALYSIS FOR CONTROLLING A FLIGHT PATH OF A SURFACE INSPECTION UNMANNED AERIAL VEHICLE

(71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 593 days.

This patent is subject to a terminal disclaimer.

(21) Appl. No.: 17/056,308

(22) PCT Filed: Feb. 26, 2018

(86) PCT No.: PCT/JP2018/006897
§ 371 (c)(1),
(2) Date: Nov. 17, 2020

(87) PCT Pub. No.: WO2019/163118
PCT Pub. Date: Aug. 29, 2019

(65) Prior Publication Data
US 2021/0208604 A1    Jul. 8, 2021

(51) Int. Cl.
*G05D 1/00* (2006.01)
*G06T 7/70* (2017.01)
(Continued)

(52) U.S. Cl.
CPC ......... *G05D 1/0094* (2013.01); *B64C 39/024* (2013.01); *B64D 47/08* (2013.01);
(Continued)

(58) Field of Classification Search
CPC ........ G05D 1/0094; G05D 1/101; G06T 7/70; G06V 20/17; G06V 20/10; G06V 20/13;
(Continued)

(56) References Cited

U.S. PATENT DOCUMENTS 10,472,062 B2 * 11/2019 Sugaya ................. B64C 39/024

FOREIGN PATENT DOCUMENTS

| CN | 106504363 A | 3/2017 |
| CN | 106796112 A | 5/2017 |

(Continued)

OTHER PUBLICATIONS

Machine translation of CN 106856002 A (Year: 2017).*
(Continued)

*Primary Examiner* — Hussein Elchanti
*Assistant Examiner* — Kenneth M Dunne
(74) *Attorney, Agent, or Firm* — Norton Rose Fulbright US LLP; James R. Crawford (57) ABSTRACT

Provided are a computer system and method using image analysis for controlling a flight path of a surface inspection unmanned aerial vehicle, wherein the computer system is configured to: acquire an image captured by a drone; perform image analysis on the acquired image; extract, in a result of the image analysis, a point whose an edge variation amount is equal to or greater than a predetermined threshold; acquire a position coordinate of the extracted point; in a case where there are a plurality of points, set a flight path of the drone in a manner of flying in an order of edge variation amounts of the plurality of points from large to small; and control the drone to fly towards the acquired position coordinate and perform capturing with a camera using light other than visible light.

4 Claims, 8 Drawing Sheets

(51) Int. Cl.
　　*B64C 39/02*　　(2023.01)
　　*B64D 47/08*　　(2006.01)
　　*H04N 23/60*　　(2023.01)
　　*B64U 10/13*　　(2023.01)
　　*B64U 101/30*　　(2023.01)
　　*G05D 1/10*　　(2006.01)
　　*G06V 20/10*　　(2022.01)
　　*G06V 20/13*　　(2022.01)
　　*G06V 20/17*　　(2022.01)

(52) U.S. Cl.
　　CPC .............. *G05D 1/101* (2013.01); *G06T 7/70* (2017.01); *G06V 20/10* (2022.01); *G06V 20/13* (2022.01); *G06V 20/17* (2022.01); *H04N 23/60* (2023.01); *B64U 10/13* (2023.01); *B64U 2101/30* (2023.01)

(58) Field of Classification Search
　　CPC ...... H04N 23/60; B64C 39/024; B64D 47/08; B64U 10/13; B64U 2101/30
　　See application file for complete search history.

(56) References Cited

FOREIGN PATENT DOCUMENTS

| CN | 106856002 A | * | 6/2017 | ........... G06T 7/0002 |
|---|---|---|---|---|
| JP | 2015-232468 A | | 12/2015 | |
| JP | 2016-82441 A | | 5/2016 | |
| JP | 2016-178769 A | | 10/2016 | |
| JP | 6259959 B1 | * | 1/2018 | ............. B64C 39/02 |
| JP | 6259959 B1 | | 1/2018 | |
| WO | WO-2016069497 A1 | * | 5/2016 | ............. G01C 11/02 |
| WO | WO-2017217185 A1 | * | 12/2017 | ............. G01N 21/88 |

OTHER PUBLICATIONS

Haotling Liu et al; "Blind Image Quality Evaluation Metrics Design for UAV Photographic Application", Jun. 2015, IEEE (Year: 2015).*
Machine translation of WO 2017217185 A1 (Year: 2017).*
International Search Report issued in PCT/JP2018/006897 dated Apr. 24, 2018.
Odffice Action dated Jun. 18, 2021 by the CIPO in the corresponding aptnet application No. 201880092742.8.

* cited by examiner

FIG. 9

SYSTEM AND METHOD USING IMAGE ANALYSIS FOR CONTROLLING A FLIGHT PATH OF A SURFACE INSPECTION UNMANNED AERIAL VEHICLE

CROSS-REFERENCE TO RELATED APPLICATION

This application is a national phase under 35 U.S.C. § 371 of International Application No. PCT/JP2018/006897 filed Feb. 26, 2018, which is hereby incorporated by reference in its entirety.

TECHNICAL FIELD

The present disclosure relates to a computer system controlling a drone for camera capturing, a drone control method, and a program.

BACKGROUND

In recent years, drones become popular and are effectively used for capturing images from the air, and the like. The captured image is analyzed and is effectively used for the damage and stain diagnosis of roads, buildings, and the like. It is known that during such capturing, an image captured based on infrared light or ultraviolet light is different from an image captured based on the visible light.

With capturing based on the infrared light or the ultraviolet light as an example, the following means is disclosed: irradiating the building with near infrared rays and analyzing the transmitted image of the building to determine whether the sealing part of packaging material is defective (referring to Patent Document 1).

EXISTING ART DOCUMENT

Patent Document

Patent Document 1: Japanese Laid-open Patent Publication No. 2015-232468.

SUMMARY

Problems to be Solved

However, in the configuration of Patent Document 1, it is necessary to continuously irradiate the object with the light having a wavelength other than a wavelength of the visible light. In a case where such a configuration is used for a drone and the like, even if a problem such as damage to the object does not exist, the light of such wavelength will also be irradiated on the object, resulting in excessive power consumption of the device and reduced flight time due to such excessive power such consumption.

Therefore, in a case where some problems of the object are initially sensed through capturing based on the visible light, capturing of the object is performed with light having a wavelength different from the wavelength of the visible light to obtain further information about the object. In addition, in a case where image analysis does not work for the image captured with the visible light, image analysis can be performed well by image re-capturing of the object with light having a wavelength different from the wavelength of the visible light.

The present disclosure aims to provide a computer system, a drone control method, and a program that can obtain information about the object while reducing the power consumption.

Solution to the Problem

The present disclosure provides solutions described below.

The present disclosure provides a computer system, including: an image acquisition unit, which is configured to acquire an image captured by a drone; an image analysis unit, which is configured to perform image analysis on the acquired image; an extraction unit, which is configured to extract, in a result of the image analysis, a point whose edge variation amount is equal to or greater than a predetermined threshold; a position coordinate acquisition unit, which is configured to acquire a position coordinate of the extracted point; and a control unit, which is configured to control the drone to fly towards the acquired position coordinate, and perform capturing with a camera using light other than visible light.

According to the present disclosure, the image captured by the drone is acquired, the image analysis is performed on the acquired image, a point whose edge variation amount is equal to or greater than a predetermined threshold is extracted in a result of the image analysis, a position coordinate of the extracted point is acquired, and the drone is controlled to fly towards to the acquired position coordinate and perform capturing with a camera using light other than visible light.

The present disclosure belongs to the category of computer systems, but in other categories such as a method and a program, the present disclosure still has the same effect and performance as in this category.

In addition, the present disclosure provides a computer system, including: an image acquisition unit, which is configured to acquire an image captured by a drone; an image analysis unit, which is configured to perform image analysis on the acquired image; an extraction unit, which is configured to extract, in a result of the image analysis, a point where image analysis is not enabled due to low resolution; a position coordinate acquisition unit, which is configured to acquire a position coordinate of the extracted point; and a control unit, which is configured to control the drone to fly towards the acquired position coordinate, and perform capturing with a camera using light other than visible light.

According to the present disclosure, the image captured by the drone is acquired, the image analysis is performed on the acquired image, a point where image analysis is not enabled due to low resolution a point where image analysis is not enabled due to low resolution is extracted in a result of the image analysis position, a position coordinate of the extracted point is acquired, and the drone is controlled to fly towards to the acquired position coordinate and perform capturing with a camera using light other than visible light.

The present disclosure belongs to the category of computer systems, but in other categories such as a method and a program, the present disclosure still has the same effect and performance as in this category.

Effects of the Present Disclosure

The present disclosure aims to provide a computer system, a drone control method, and a program that can obtain information about the object while reducing the power consumption.

DETAILED DESCRIPTION

Hereinafter, best modes for carrying out the present disclosure will be described with reference to the drawings. It is to be noted that the embodiments are only examples and not intended to limit the scope of the present disclosure.

[Overview of Drone Control System 1]

Figure 1:
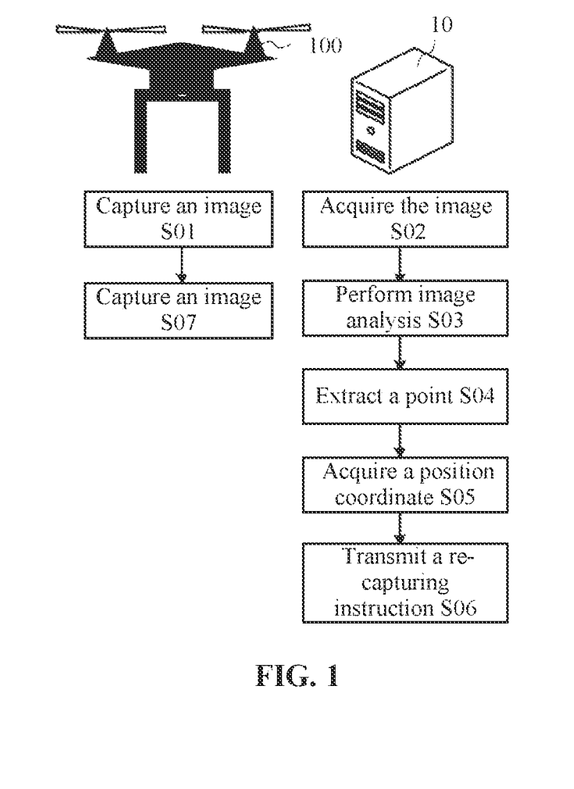
FIG. 1 is an outline diagram of a drone control system 1.

The summary of a preferred embodiment of the present disclosure will be described based on FIG. 1. FIG. 1 is a diagram for describing the overview of the drone control system 1 as a preferred embodiment of the present disclosure. The drone control system 1 is formed by a computer 10 and a drone 100. The drone control system 1 is a computer system in which the computer 10 acquires an image such as a moving image and a still image captured by a camera possessed by the drone 100 and performs various processings on the acquired images. Based on processing results of the computer 10, the drone control system 1 performs various controls for the drone 100, such as a flight path setting of the drone 100 and the image capturing after wavelength change.

It is to be noted that in the drone control system 1, the number of computers 10 and the number of the drones 100 can be changed as appropriate. In addition, the drone control system 1 may also possess other terminal devices in addition to a terminal device that controls the drone 100.

The computer 10 is a computer device connected to the drone 100 via a network so as to enable data communication by wireless communication, priority communication, or the like. The computer 10 is a computer device that performs image analysis, control of the drone 100, and the like.

The drone 100 is an unmanned aerial vehicle, a multi-rotor helicopter or the like which is connected to the computer 10 so as to enable data communication and flies based on a preset flight path or a flight path designated by a terminal device (not shown). The drone 100 has a camera capable of capturing an image using not only visible light but also light of other wavelengths (such as infrared light and ultraviolet light) different from the wavelength of the visible light. The drone 100 transmits the captured image to the computer 10.

Outline of the drone control processing executed by the drone control system 1 will be described below.

It is to be noted that each processing described later is not limited to being executed by either the computer 10 or the drone 100, and may be executed by both the computer 10 and the drone 100. Alternatively, each process described as the process executed by the computer 10 may be executed by the drone 100, or vice versa.

First, the drone 100 flies in the vicinity of a place or a building which is taken as the object and captures an image (step S01). Here, the drone 100 flies over a preset flight path and captures the place, the building or the like which is taken as the object. In this case, the image captured by the drone 100 is a visible light image.

The drone 100 transmits the captured image to the computer 10. At this time, the drone 100 transmits a position coordinate and an altitude of the drone 100 itself in capturing the image to the computer 10 together with the image. The computer 10 acquires an image captured by the drone 100 through receiving this image (step S02).

The computer 10 performs image analysis on the acquired image (step S03). The computer 10 performs edge detection on the acquired visible light image. The edge detection is to determine a discontinuously changing part. For example, as the edge detection, the computer 10 detects whether the depth is discontinuous, whether the orientation of the surface is discontinuous, whether the material changes or whether the lighting changes.

The computer 10 extracts a point whose edge variation amount is equal to or greater than a predetermined threshold in a result of the image analysis (step S04). When the computer 10 detects, for example discoloration, temperature changing or deformation as the amount of change in hedge, the computer 10 determines whether the amount of change is equal to or greater than a predetermined threshold, and extracts a point whose amount of change is equal to or greater than the predetermined threshold in the determination result.

The computer 10 acquires a position coordinate of the extracted point (step S05). The computer 10 acquires an actual position coordinate based on a coordinate in the image of the extracted point. Here, a position coordinate of the drone 100 in capturing the image is acquired as the position coordinate of the extracted point.

The computer 10 transmits a flight instruction of the position coordinate to the drone 100, and transmits a re-capturing instruction to capture an image at this point by a camera using light having a wavelength other than the wavelength of the visible light (step S06).

It is to be noted that in a case where there are a plurality of points, the flight instruction and the re-capturing instruction are transmitted for all points. Therefore, the drone control system 1 sets the flight path for the drone 100 in a manner of flying over all the points.

In addition, in a case where there are a plurality of points, the drone 100 transmits the flight instruction and the re-capturing instruction in a manner of flying in an order of position coordinates of the plurality of points from near to far. Therefore, the drone control system 1 sets the flight path for the drone 100 in a manner of flying in the order of the position coordinates from near to far.

The drone 100 receives the flight instruction and the re-capturing instruction, flies to the position coordinate of this point, and captures an image of this point by using light having a wavelength other than the wavelength of the visible light (step S07). In this way, the drone control system 1 controls the drone 100 to fly towards the acquired position coordinate and perform capturing by a camera using light having a wavelength other than the wavelength of the visible light.

VARIATION EXAMPLE

A variation example of the drone control system 1 is also described. This variation example differs from the above-mentioned embodiment in the processing in the step S04 described above. For other processings, a detail description thereof is omitted.

As in the above-mentioned embodiment, the drone 100 captures an image (a visible light image) of an object and transmits the image to the computer 10. In this case, the drone 100 also transmits the position coordinate and the altitude of the drone 100 itself.

As in the above-mentioned embodiment, the computer 10 performs image analysis on the acquired image.

The computer 10 extracts, in a result of the image analysis, a point where image analysis is not enabled due to low resolution. For example, in a case where there is a point whose edge variation amount cannot be detected, the computer 10 determines that the image analysis is not enabled due to low resolution, and extracts the point.

As in the above-mentioned embodiment, the computer 10 acquires a position coordinate of the extracted point, and transmits a flight instruction and a re-capturing instruction of the position coordinate to the drone 100.

It is to be noted that, as in the above-mentioned embodiment, in a case where there are a plurality of points, the flight instruction and the re-capturing instruction may be transmitted to all points.

In addition, as in the above-mentioned embodiment, in a case where there are a plurality of points, the drone 100 transmits the flight instruction and the re-capturing instruction in a manner of flying in an order of position coordinates of the plurality of points from near to far.

As in the above-mentioned embodiment, the drone 100 receives the flight instruction and the re-capturing instruction, flies to the position coordinate of this point, and captures the image of this point with light having a wavelength other than the wavelength of the visible light.

The above is the outline of drone control system 1

[System Structure of Drone Control System 1]

Figure 2:
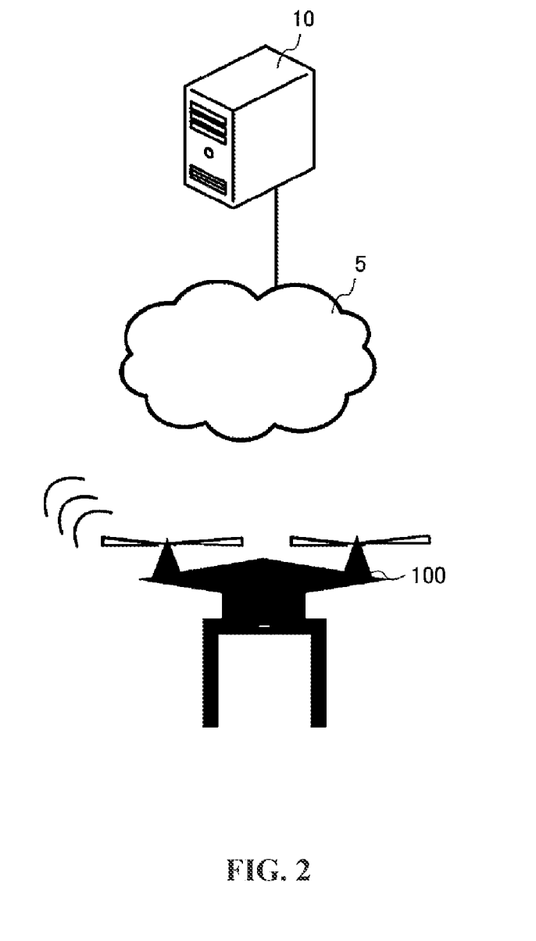
FIG. 2 is an overall structural diagram of a drone control system 1.

A system structure of the drone control system 1 as a preferred embodiment of the present disclosure will be described based on FIG. 2. FIG. 2 is a diagram of the system structure of the drone control system 1 as a preferred embodiment of the present disclosure. The drone control system 1 is formed by a computer 10 and a drone 100, and is a computer system in which the computer 10 acquires an image such as a moving image and a still image captured by a camera possessed by the drone 100 and performs various processings based on the acquired image.

It is to be noted that the number of computers 10 and the number of drones 100 are not limited to one, and may be multiple. In addition, the computer 10 is not limited to an actual device, and may be a virtual device. In addition, the computer 10 may be communicably connected to other terminal devices (not shown) via a public network 5 or the like.

The computer 10 is the above computer device having functions described later.

The drones 100 is the above drone, a multi-rotor helicopter or the like which has functions described later.

DESCRIPTION OF FUNCTIONS

Figure 3:
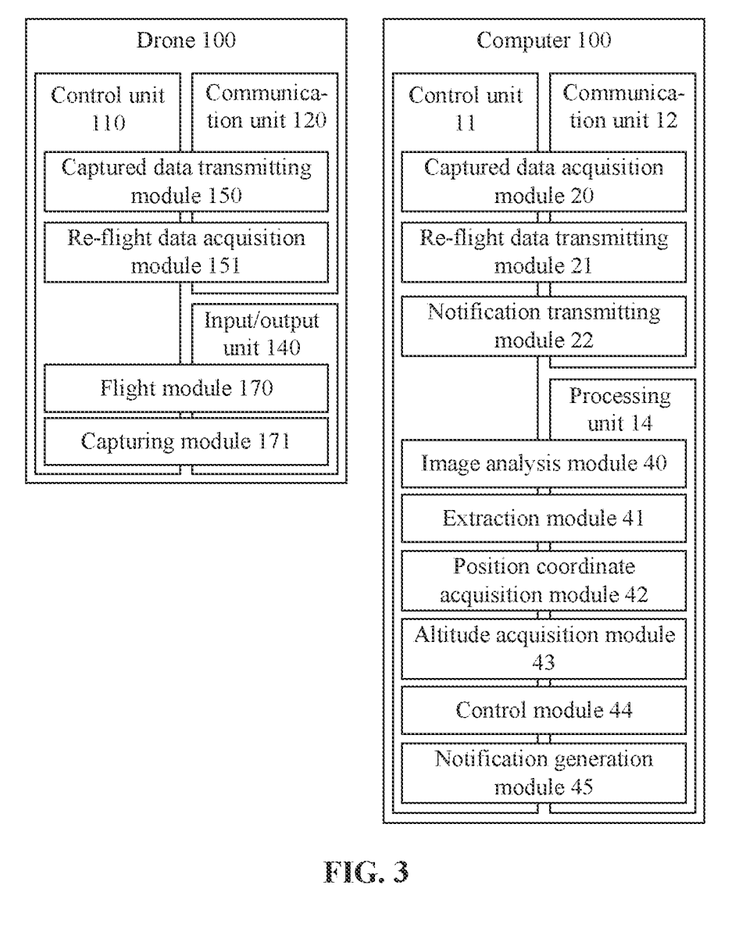
FIG. 3 is a functional block diagram of a drone control system 1.

Functions of the drone control system 1 as a preferred embodiment of the present disclosure will be described based on FIG. 3. FIG. 3 is a functional block diagram of the computer 10 and the drone 100.

The computer 10 has a central processing unit (CPU), a random access memory (RAM), a read only memory (ROM) and the like as a control unit 11, and also has a component such as a wireless-fidelity (Wi-Fi) component based on IEEE802.11 which can communicate with other devices as a communication unit 12. Furthermore, the computer 10 has a store unit for storing data through a hard disk, a semiconductor memory, a recording medium, a memory card or the like as a storage unit. In addition, the computer 10 has various devices as a processing unit 14 that performs various processes such as image analysis, flight path setting of the drone 100, flight instruction and re-capturing instruction.

In the computer 10, the control unit 11 reads specific programs and cooperates with the communication unit 12 to implement a captured data acquisition module 20, a re-flight data transmitting module 21 and a notification transmitting module 22. In addition, in the computer 10, the control unit 11 reads specific programs and cooperates with the processing unit 14 to implement an image analysis module 40, an extraction module 41, a position coordinate acquisition module 42, an altitude acquisition module 43, a control module 44, and a notification generation module 45.

Like the computer 10, the drone 100 also has a CPU, a RAM, a ROM and the like as a control unit 110, and a component which can communicate with other devices as a communication unit 120. In addition, the drone 100 has various devices such as a flight device required for flight and a camera for capturing images as an input/output unit 140.

In the drone 10, the control unit 110 reads specific programs and cooperates with the communication unit 120 to implement a captured data transmitting module 150 and a re-flight data acquisition module 151. Furthermore, in the drone, the control unit 110 reads specific programs and cooperates with the input/output unit 140 to implement a flight module 170 and a capturing module 171.

[Drone Control Processing]

Figure 4:
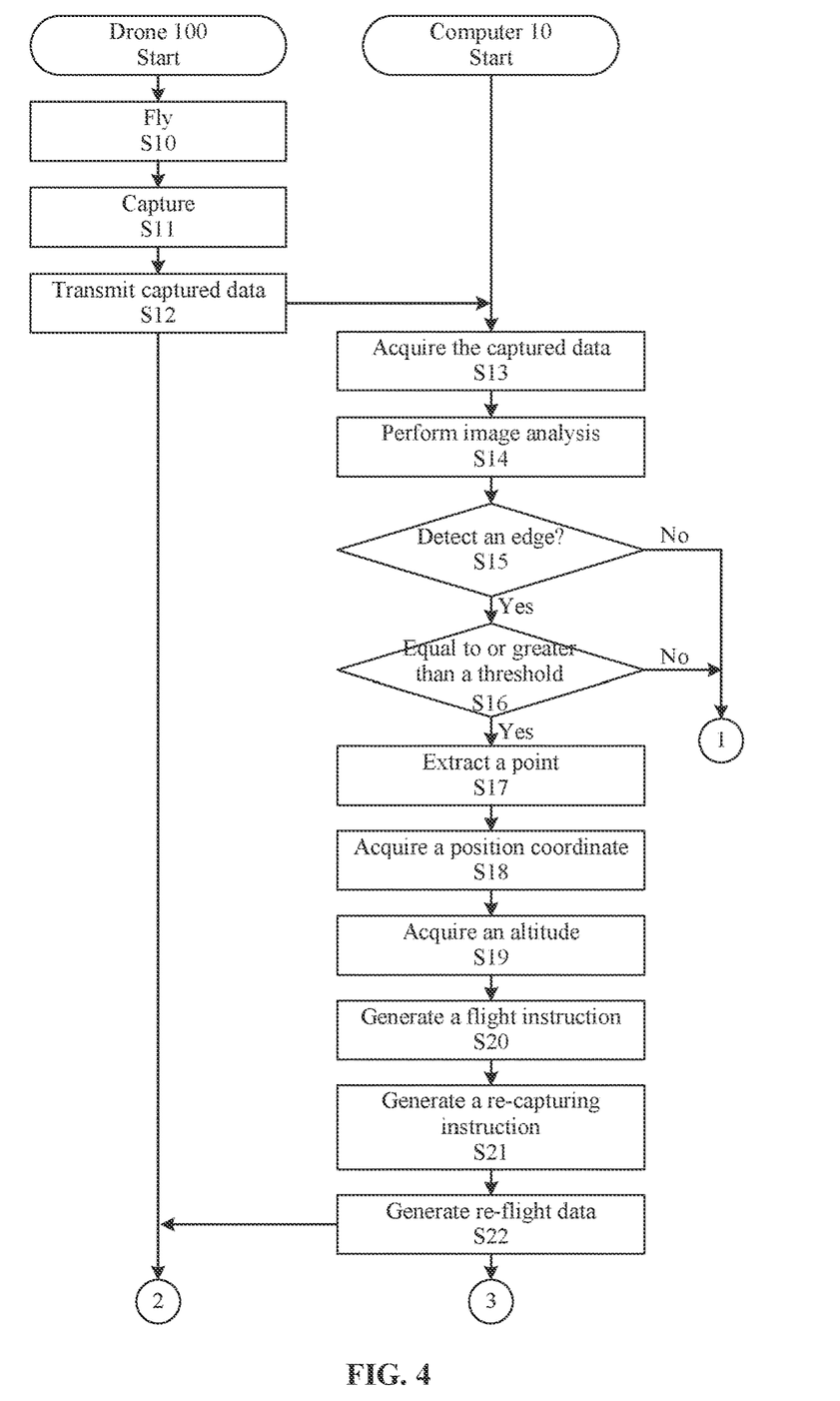
FIG. 4 is a flowchart of a drone control processing executed by a drone control system 1.
Figure 5:
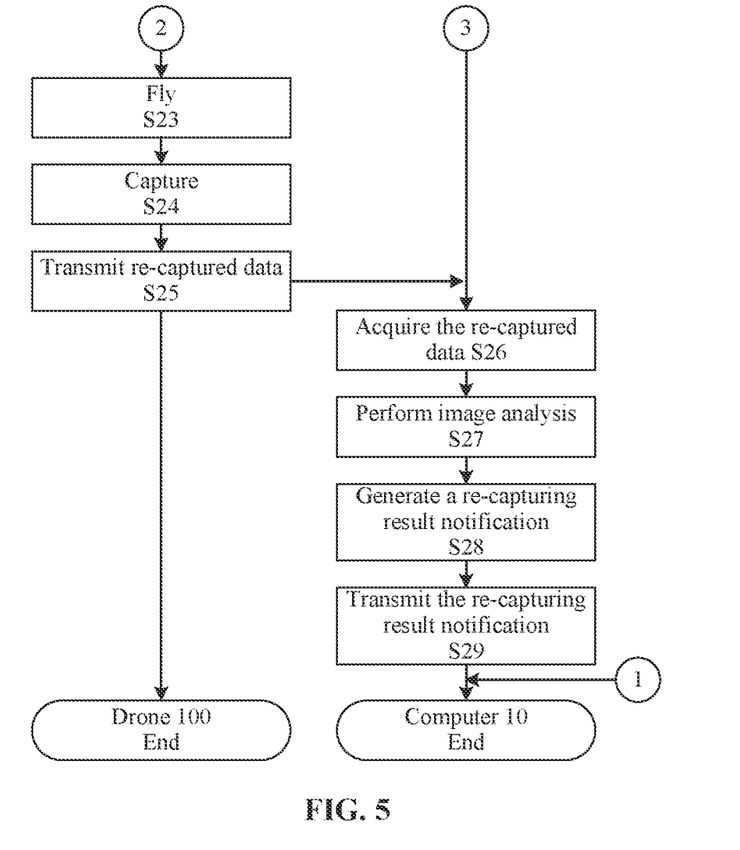
FIG. 5 is a flowchart of a drone control processing executed by a drone control system 1.

Based on FIGS. 4 and 5, the drone control processing executed by the drone control system 1 will be described. FIGS. 4 and 5 are flowcharts of drone control processings executed by a computer 10 and a drone 100. Processings executed by modules of each of the above device will be described with the current processing together.

First, the flight module 170 flies in the vicinity of a place or a building which is taken as the object based on a preset flight path (step S10). In step S10, the flight module 170 flies at a predetermined speed according to a flight instruction from the computer 10 or a terminal device (not shown), and the flight path set by the computer 10 and the terminal device. The place or the building which is taken as the object refers to, for example, a road, a tunnel, or a building.

The capturing module 171 captures an image such as a moving image or a still image (step S11). In step S11, the capturing module 171 continuously performs capturing at a preset place or during the flight. The capturing module 171 captures the image at a wavelength of the visible light. That is, the image captured by the capturing module 171 in step S11 is a visible light image.

The captured data transmitting module 150 transmits the image captured by the capturing module 171, a position coordinate (position information of the capturing module 171 itself acquired in a Global Positioning System (GPS), the position information corresponding to a current position of the capturing module 171 itself in the set flight path) of the capturing module 171 itself in the captured place, and an altitude (acquired by an altimeter provided in the drone 100) of the capturing module 171 itself in the captured place to the computer 10 as captured data (step S12).

It is to be noted that the position coordinate and the altitude may not necessarily be included, and the captured data transmitting module 150 may merely transmit an image as the captured data. In addition, the captured data transmitting module 150 may also transmit the image and the position coordinate as the captured data.

The captured data acquisition module 20 acquires the captured data transmitted by the drone 100 (step S13). In step S13, the captured data acquisition module 20 acquires the image captured by the drone 100, the position coordinate of the drone 100 and the altitude of the drone 100 by receiving the captured data transmitted by the drone 100.

The image analysis module 40 performs the image analysis on the image (step S14). In step S14, the image analysis module 40 performs edge detection on the acquired image. The edge detection is to determine a discontinuously changing part. For example, as the edge detection, the image analysis module 40 detects whether the depth is discontinuous, whether the orientation of the surface is discontinuous, whether the material changes or whether the lighting changes.

The image analysis module 40 determines whether the edge can be detected (step S15). In step S15, the image analysis module 40 determines whether the edge can be detected based on whether there is a discontinuously changing part in the image. In addition, the image analysis module 40 determines whether elements such as discoloration, temperature changing and deformation can be detected.

In step S15, in a case where the image analysis module 40 determines that the edge cannot be detected (step S15: NO), the image analysis module 40 determines that there is no problem with the object captured in the image because the edge cannot be detected in the image, and the processing is temporarily stopped. In this case, the computer 10 waits for the processing until next captured data is acquired from the drone 100.

On the other hand, in step S15, in a case where the image analysis module 40 determines that the edge can be detected (step S15: YES), the image analysis module 40 determines whether the detected edge variation amount is equal to or greater than a predetermined threshold (step S16). In step S16, the image analysis module 40 determines whether the edge variation amount (such as a discoloration degree, a temperature changing degree and a deformation degree) is equal to or greater than the predetermined threshold (for example, a value sufficient to determine that an abnormality occurs). In a case where the image analysis module 40 determines that the edge variation amount is not equal to or greater than the predetermined threshold (step S16: NO), although the edge variation amount can be detected in the image, the image analysis module 40 determines that there is no problem with the object captured in the image, and the processing is temporarily stopped. In this case, the computer 10 waits for the processing until next captured data is acquired from the drone 100.

On the other hand, in step S16, in a case where the image analysis module 40 determines that the edge variation amount is equal to or greater than the predetermined threshold (step S16: YES), the extraction module 41 extracts a point whose edge variation amount is equal to or greater than the predetermined threshold (step S17). In step S17, the extraction module 41 extracts the point as a point where the abnormality occurs.

Figure 8:
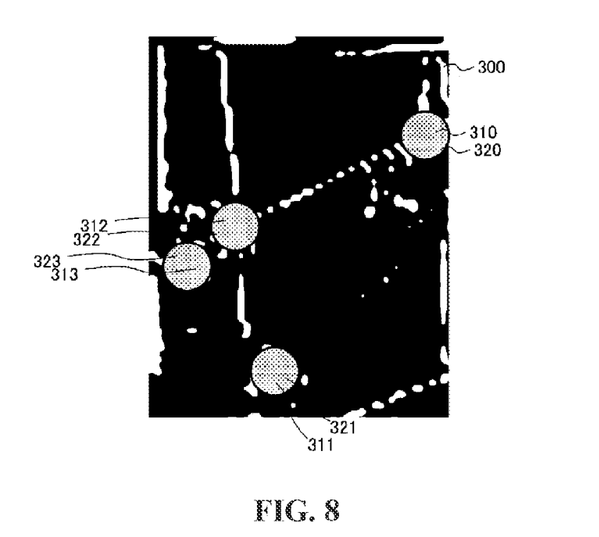
FIG. 8 is a diagram of an example of points whose edge variation amounts are equal to or greater than a predetermined value.

Based on FIG. 8, the points whose edge variation amount are equal to or greater than the predetermined threshold and which are extracted by the extraction module 41 will be described. FIG. 8 is a diagram exemplarily showing the points whose edge variation amount are equal to or greater than the predetermined value. In FIG. 8, for the points 310 to 313 extracted by the extraction module 41, frame lines 320 to 323 are schematically shown. For each of the points 310 to 313 extracted by the extraction module 41, this point means a place where the edge variation amount is equal to or greater than the predetermined value in the image 300.

The position coordinate acquisition module 42 acquires a position coordinate of the extracted point (step S18). In step S18, the position coordinate acquisition module 42 acquires an actual position coordinate (position information of an actual place corresponding to the point in the image) based on the coordinate of the extracted point in the image. The position coordinate acquisition module 42 acquires the position coordinate of the drone 100 included in the above-mentioned captured data as the position coordinate of the point.

It is to be noted that in a case where a plurality of points are extracted, the position coordinate acquisition module 42 regards these points as approximately the same position coordinate, and acquires the position coordinate of the drone 100 at a place where the image is captured as the position coordinate of the points. In addition, in a case where a same point is extracted in multiple images, that is, in a case where after one point is extracted in one image, the one point is also extracted in an image different from the one image, an average value of the position coordinates of the drone 100 in capturing various images is acquired as the position coordinate of the one point. The position coordinate of one point at this time can also be applied to two or more images.

The altitude acquisition module 43 acquires an altitude of the extracted point (step S19). In step S19, the altitude acquisition module 43 acquires, based on a flight height of the drone 100 in the image of the extracted point, the altitude at which the image is captured.

The control module 44 generates a flight instruction to make the drone 100 fly to the position coordinate and the altitude of the acquired point (step S20). In step S20, in a case where one point is acquired, the control module 44 generates, as the flight instruction, a setting for flying to the position coordinate and the altitude of the point. In addition, in a case where there are a plurality of acquired points, the control module 44 generates, as the flight instruction, a setting for flying to each of these points. Specific contents of the flight instruction of flying over such points may be listed as below: simply flying over all points in any order, flying in an order of position coordinates of the points from near to far, flying in an order of edge variation amounts of the points from large to small, flying in an order of battery consumption from less to more, and the like. Flying over all points refers to: flying over or near the extracted point in any order, for example, randomly in an order of capturing the images or an order opposite to the order of capturing the images. In addition, flying in the order of position coordinates of the points refers to comparing the position coordinate and the altitude of the drone 100 at the current position with the position coordinates and the altitudes of the points, and flying over or near the corresponding points in an order of approaching to the position coordinate of the drone 100. In addition, flying in the order of edge variation amounts of the points from large to small refers to flying over or near the corresponding points in the order of edge variation amounts in the extracted points from large to small. In addition, flying in the order of battery consumption from less to more refers to flying over or near the corresponding points in the order of battery consumption required by the flight in the extracted points from less to more.

The control module 44 generates a re-capturing instruction to capture this point with a camera using light other than the visible light (step S21). In step S21, the control module 44 generates, as the re-capturing instruction, an instruction controlling the drone 100 to capture the extracted point by a camera capable of capturing an image based on light having a wavelength (such as infrared light and ultraviolet infrared light) other than the wavelength of the visible light.

The re-flight data transmitting module 21 transmits the flight instruction and the re-capturing instruction to the drone 100 as re-flight data (step S22). In step S22, the flight instruction and the re-capturing instruction are transmitted as the re-flight data to the drone 100 that has acquired the captured data.

It is to be noted that the re-flight data transmitting module 21 may also transmit the re-flight data to a drone 100 which is different from the drone 100 that has acquired the captured data. For example, in the case where the drone 100 merely has a camera capturing the images based on the visible light, or there is no remaining battery level that is deemed necessary for re-capturing (in this case, the drone 100 transmits its remaining battery level of the drone 100 at the time of completing the flying one time, transmitting the captured data, or the like), the re-flight data is transmitted to a drone 100 (a drone having a device for capturing an image based on light other than visible light or a drone having a remaining battery level necessary for re-capturing) different from the drone 100.

The re-flight data acquisition module 151 acquires the re-flight data. The flight module 170 flies to the extracted point based on the re-flight data (step S23). The processing of the step S23 is substantially the same as the processing of the step S10 described above, and the flight is based on the flight instruction included in the re-flight data.

The capturing module 171 captures an image of this point (step S24). In step S24, the capturing module 171 captures the image with light having a wavelength other than the wavelength of the visible light, such as the infrared light and the ultraviolet light. That is, the image captured by the capturing module 171 in the step S24 refer to an image of a wavelength other than visible light.

The captured data transmitting module 150 transmits the image captured by the capturing module 171, the position coordinate and the altitude of the capturing module 171 itself at the capturing place to the computer 10 as re-captured data (step S25). The processing of the step S25 is the same as the processing of the step S12 described above.

It is to be noted that, similarly to the processing of the step S12 described above, the position coordinate and the altitude may not necessarily be included, and merely the image may be transmitted as the re-captured data. In addition, the captured data transmitting module 150 may also transmit the image and the position coordinate as the re-captured data.

The capturing data acquisition module 20 acquires the captured data transmitted by the drone 100 (step S26). In step S26, similarly to the processing of the step S13 described above, the capturing data acquisition module 20 acquires the image, the position coordinate, and the altitude captured by the drone 100.

The image analysis module 40 analyzes the image (step S27). In step S27, the image analysis module 40 performs the edge detection, the other feature detection, and the feature extraction. The image analysis module 40 acquires more information about the captured object through the feature detection and the feature extraction. More information refers to, for example, the presence or absence of damages or stains, the size, location, number and the like of the damages or the stains in the presence of the damages or stains, and a notification to that effect if there are no damages or stains.

The notification generation module 45 generates more information obtained by a result of the image analysis as a re-capturing result notification (step S28). In the step S28, the re-capturing result notification is obtained by textualizing or voicing the presence or absence of damages or stains, the size, location, number of the damages or stains, the fact that there are no damages or stains, the fact that an edge is detected in the image of a wavelength of visible light but an edge is not detected in the image of a wavelength other than visible light.

The notification transmitting module 22 transmits the generated re-capturing result notification to a terminal device or the like held by a user (not shown) (step S29). The terminal device or the like receives the re-capturing result notification, and notifies the user by displaying or playing the re-capturing result notification by the terminal device itself. The user can grasp the actual condition of the object based on the re-capturing result notification.

The above is the drone control processing.

It is to be noted that the above respective processing may not necessarily be executed by one hardware. For example, the above respective processing may be executed by either or both of the computer 10 and the drone 100.

VARIATION EXAMPLE

Figure 6:
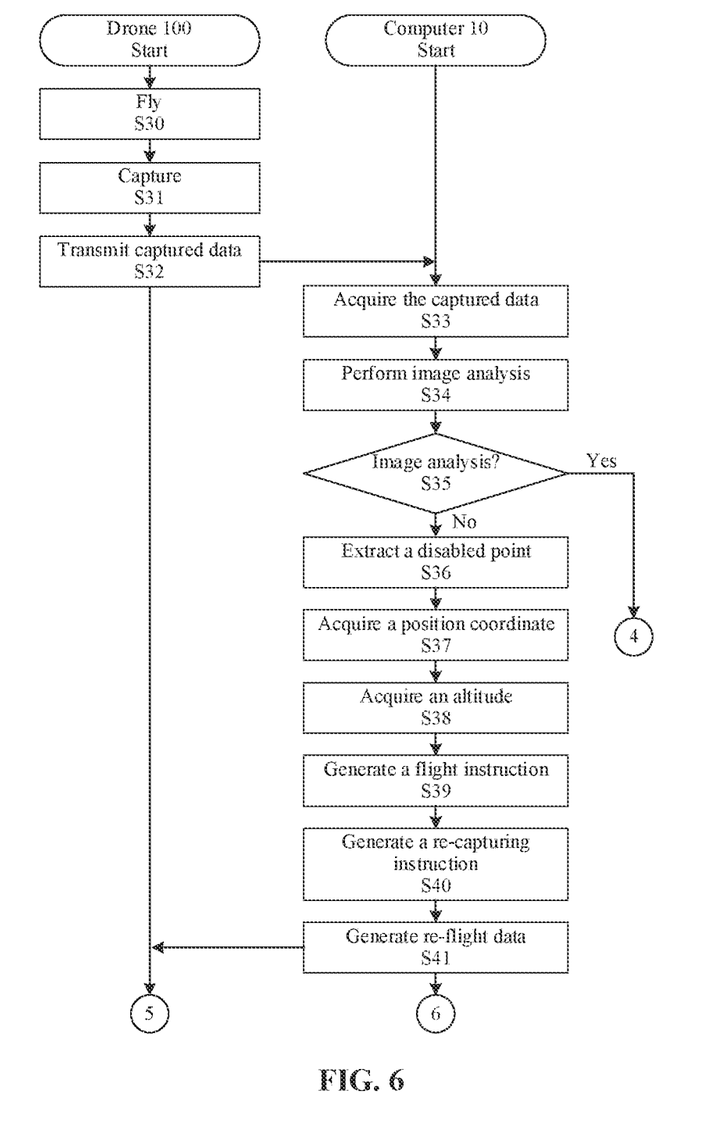
FIG. 6 is a flowchart of a variation example of a drone control processing executed by a drone control system 1.
Figure 7:
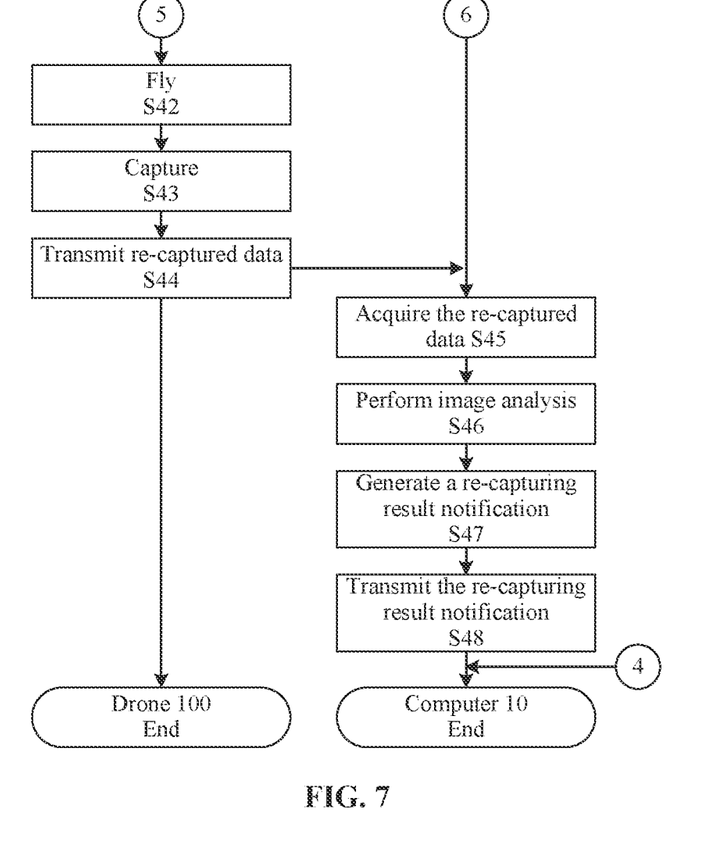
FIG. 7 is a flowchart of a variation example of a drone control processing executed by a drone control system 1.

Based on FIGS. 6 and 7, a variation example of the drone control processing executed by a drone control system 1 will be described. FIGS. 6 and 7 are flowcharts of the variation example of the drone control processing executed by a computer 10 and a drone 100. Processings executed by modules of each of the above devices will be described with the current processing together.

It is to be noted that for the configuration similar to the above-mentioned embodiment, a detailed description thereof will be omitted, and differences thereof will be described.

First, the drone 100 executes processings of the above-mentioned steps S10 to S12 (steps S30 to S32). The drone 100 flies near a place or a building which is taken as the object, captures an image, and transmits the captured data to the computer 10.

Similarly to the processing of the steps S13 and S14 described above, a capturing data acquisition module 20 acquires the captured data and performs image analysis (steps S33 and S34).

The image analysis module 40 determines whether the image analysis is enabled (step S35). In the step S35, similarly to the step S15 described above, the image analysis module 40 determines whether the edge detection is enabled. In addition, the image analysis module 40 determines whether other detection processings in addition to the edge detection is enabled.

In the step S35, in a case where the image analysis module 40 determines that the image analysis is not enabled (step S35: YES), the processings after the step S16 in the above-mentioned drone 100 control processing are executed. It is to be noted that in this variation example, to simplify the description, it is described in the figure as ending this processing.

On the other hand, in the step S35, in a case where the image analysis module 40 determines that the image analysis is not enabled (step S35: NO), the extraction module 41 extracts a point where image analysis is not enabled as a disabled point where image analysis is not enabled (step S36). In the step S36, the image analysis module 40 determines that the image analysis is not enabled for the disabled point due to low resolution, and the extraction module 41 extracts the disabled point.

It is to be noted that the image analysis module 40 may also determines that the image analysis is not enabled for the disabled point due to other reasons. For example, it may be determined that the image analysis is not enabled since a distance between the drone 100 and the object is too close, or it may be determined that the image analysis is not enabled since the flight of the drone 100 is unstable so that a clear image cannot be obtained.

Figure 9:
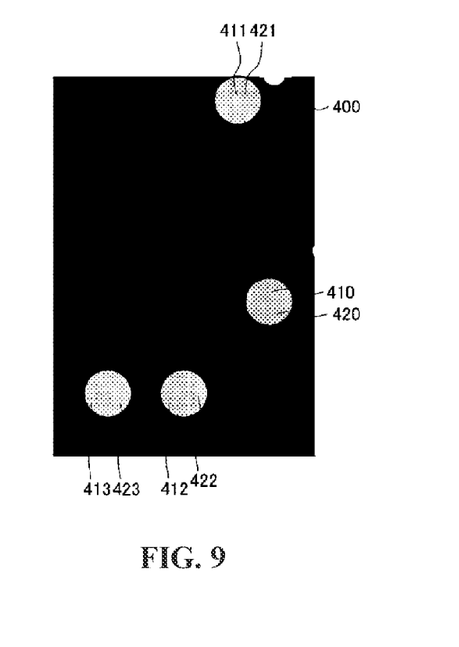
FIG. 9 is a diagram of an example of points where image analysis is not enabled due to low resolution.

Based on FIG. 9, disabled points extracted by the extraction module 41 are described below. FIG. 9 is a diagram schematically showing the disabled points. In FIG. 9, for the disabled points 410 to 413 extracted by the extraction module 41, frame lines 420 to 423 are schematically shown. The extraction module 41 means that the place in the image 400 is a place where the image analysis is not enabled for each of the extracted disabled points 410 to 413.

The computer 10 executes the same processings as the processings of the steps S18 to S22 described above (steps S37 to S41).

The position coordinate acquisition module 42 acquires a position coordinate of the extracted disabled point (step S37). Similarly to the step S18 described above, in a case where multiple disabled points are extracted, these disabled points are regarded as approximately the same position coordinate, and the position coordinate of the drone 100 at a position where the image is captured is regarded as a position coordinate of the disabled points. In addition, in a case where a same disabled point is extracted in multiple images, that is, in a case where after one disabled point is extracted in one image, the one disabled point is also extracted in an image different from the one image, an average value of the position coordinates of the drone 100 in capturing various images is acquired as the position coordinate of the one disabled point. In this case, the position coordinate of the one disabled point at this time can also be applied to two or more images.

The altitude acquisition module 43 acquires an altitude of the extracted disabled point (step S38).

The control module 44 generates a flight instruction to make the drone 100 fly to the position coordinate and the altitude of the acquired disabled point (step S39). In step S39, in a case where one disabled point is acquired, the control module 44 generates, as the flight instruction, a setting for flying to the position coordinate and the altitude of the disabled point. In addition, in a case where there are multiple extracted points, the control module 44 generates, as the flight instruction, a setting for flying to each of these disabled points. Specific contents of the flight instruction of flying over such multiple disabled points may be listed as below: simply flying over all disabled points in any order, flying in an order of position coordinates of the disabled points from near to far, and the like. Flying over all disabled points refers to: flying over or near the extracted disabled point in any order, for example, randomly in an order of capturing the images or an order opposite to the order of capturing the images. In addition, flying in an order of position coordinates of the disabled points from near to far refers to comparing the position coordinate and the altitude of the drone 100 at a current position with the position coordinates and the altitudes of the disabled points, and flying over or near the corresponding points in an order of approaching to the position coordinate of the drone.

The control module 44 generates a re-capturing instruction to capture this point with a camera using light other than the visible light (step S40).

The re-flight data transmitting module 21 transmits the flight instruction and the re-capturing instruction to the drone 100 as re-flight data (step S41).

It is to be noted that the re-flight data transmitting module 21 may also transmit the re-flight data to a drone 100 which is different from the drone 100 that has acquired the captured data. For example, in the case where the drone 100 merely has a camera capturing the images based on the visible light, or there is no remaining battery level that is deemed necessary for re-capturing (in this case, the drone 100 transmits its remaining battery level of the drone 100 at the time of completing the flying one time, transmitting the captured data, or the like), the re-flight data is transmitted to a drone 100 (a drone having a device for capturing an image based on light other than visible light or a drone having a remaining battery level necessary for re-capturing) different from the drone 100.

The drone 100 executes the same processings as the processings of the above-mentioned steps S23 to S25 (steps S42 to S44).

The re-flight data acquisition module 151 acquires the re-flight data. The flight module 170 flies to the extracted point based on the re-flight data (step S42).

The capturing module 171 captures an image of this disabled point (step S43). In step S43, the capturing module 171 captures the image with light having a wavelength other than the wavelength of the visible light, such as the infrared light and the ultraviolet light.

The captured data transmitting module 150 transmits the re-captured data to the computer 10 (step S44).

The computer 10 executes the same processing as the processings of the steps S26 to S29 described above (steps S45 to S48).

The capturing data acquisition module 20 acquires the captured data transmitted by the drone 100 (step S45).

The image analysis module 40 analyzes the images (step S46). In step S46, the image analysis module 40 performs the edge detection, the other feature detection, and the feature extraction. The image analysis module 40 acquires more information of the captured object through the feature detection and the feature extraction. More information refers to, for example, the presence or absence of damages or stains, the size, location, number and the like of the damages or the stains in the presence of the damages or stains, and a notification to that effect if there are no damages or stains.

The notification generation module 45 generates more information obtained by a result of the image analysis as a re-capturing result notification (step S47).

The notification transmitting module 22 transmits the generated re-capturing result notification to a terminal device or the like held by a user (not shown) (step S48). The terminal device or the like receives the re-capturing result notification, and notifies the user by displaying or playing the re-capturing result notification by the terminal device itself. The user can grasp the actual condition of the object based on the re-capturing result notification.

The above is the variation example of the drone control processing.

It is to be noted that the above respective processings may not necessarily be executed by one hardware. For example, the above respective processings may be executed by either or both of the computer 10 and the drone 100.

The above units and functions are implemented by reading and executing specified programs by a computer (including a CPU, an information processing device and various terminals). The programs, for example, are provided by a solution provided from a computer via a network (i.e., software as a service (SaaS)). Furthermore, the programs are provided in a manner of being recorded in a computer-readable recording medium such as a floppy disk, a compact disk (CD) (such as a compact disc read-only memory (CD-ROM)), and a digital versatile disc (DVD) (such as a DVD-ROM and a DVD random access memory (DVD-RAM)). In this case, the computer reads the programs from the recording medium, transmits the programs to an internal storage device or an external storage device to store, and then executes the programs. Furthermore, the programs may also be recorded in advance in a storage device (recording medium) such as a magnetic disk, an optical disk or a magneto-optical disk, and provided to the computer from the storage device via a communication line.

The embodiments of the present disclosure have been described above, but the present disclosure is not limited to the above embodiments. Furthermore, the effects described in the embodiments of the present disclosure are merely illustrative of the most appropriate effects produced by the present disclosure, and the effects of the present disclosure are not limited to the effects described in the embodiments of the present disclosure.

LIST OF REFERENCE NUMBERS

1 drone control system; 10 computer; 100 drone.

What is claimed is:

1. A computer system using image analysis for controlling a flight path of a surface inspection unmanned aerial vehicle, wherein the computer system comprises a computer and a drone connected with the computer, and the computer comprises a processor and a memory,
wherein the processor is configured to:
acquire an image captured by the drone;
perform image analysis on the acquired image;
extract, in a result of the image analysis, a point whose an edge variation amount is equal to or greater than a predetermined threshold;
acquire a position coordinate of the extracted point;
in a case where there are a plurality of points, set a flight path of the drone in a manner of flying in an order of edge variation amounts of the plurality of points from large to small; and
control the drone to fly towards the acquired position coordinate and perform capturing with a camera using light other than visible light.

2. The computer system of claim 1, wherein the processor is configured to:
in a case where there are a plurality of points, set a flight path of the drone in a manner of flying over all the plurality of points.

3. A method using image analysis for controlling a flight path of a surface inspection unmanned aerial vehicle, executed by a computer system, wherein the computer system comprises a computer and a drone connected with the computer, and the computer comprises a processor and a memory, wherein the method comprises:
acquiring an image captured by the drone;
performing image analysis on the acquired image;
extracting, in a result of the image analysis, a point whose an edge variation amount is equal to or greater than a predetermined threshold;
acquiring a position coordinate of the extracted point;
setting, in a case where there are a plurality of points, a flight path of the drone in a manner of flying in an order of edge variation amounts of the plurality of points from large to small; and
controlling the drone to fly towards the acquired position coordinate and perform capturing with a camera using light other than visible light.

4. A non-transitory computer-readable storage medium, configured to store a program, wherein the program, when executed by a processor, implements the method of claim 3.

* * * * *